Figure 1:
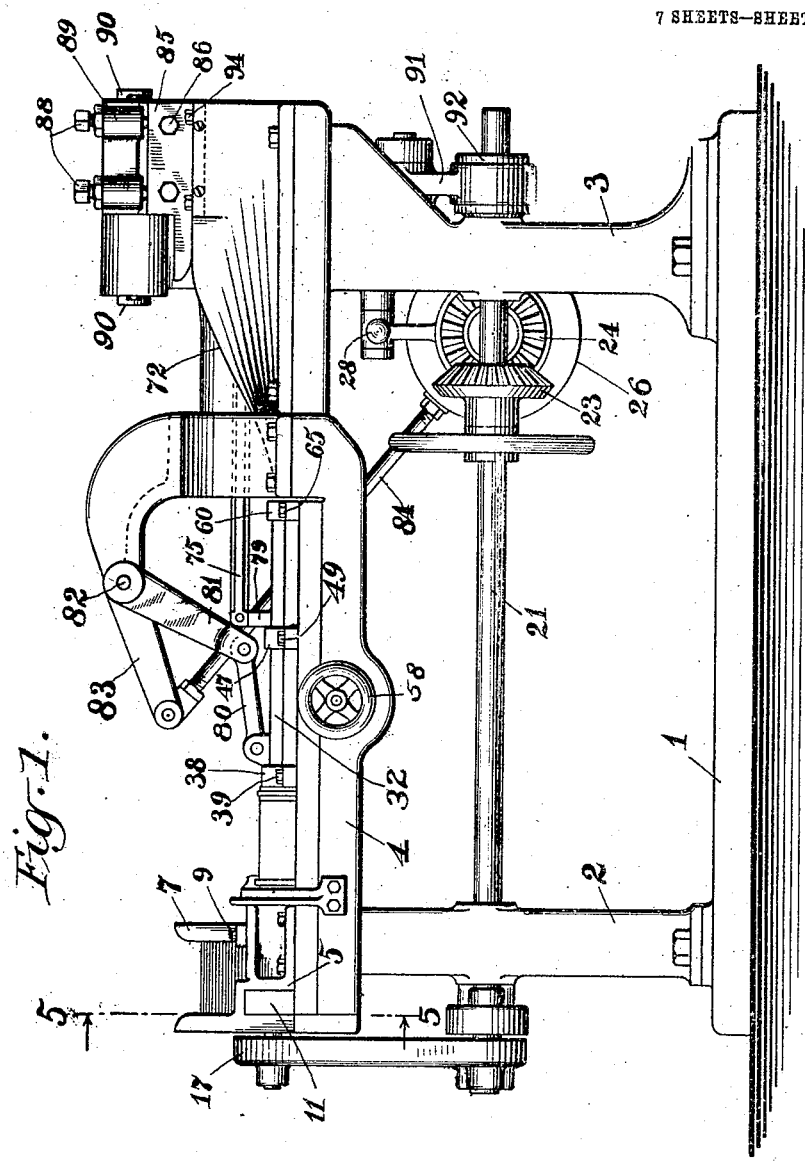

R. G. CLARK.
CAN FORMING MACHINE.
APPLICATION FILED DEC. 4, 1911.

1,086,700.

Patented Feb. 10, 1914.
7 SHEETS—SHEET 1.

WITNESSES:

INVENTOR
Robert G. Clark,
BY
Lewis J. Doolittle
ATTORNEY

R. G. CLARK.
CAN FORMING MACHINE.
APPLICATION FILED DEC. 4, 1911.

1,086,700.

Patented Feb. 10, 1914.
7 SHEETS—SHEET 3.

WITNESSES:

INVENTOR
Robert G. Clark,
BY
Lewis J. Doolittle
ATTORNEY

R. G. CLARK.
CAN FORMING MACHINE.
APPLICATION FILED DEC. 4, 1911.

1,086,700.

Patented Feb. 10, 1914.
7 SHEETS—SHEET 4.

WITNESSES:

INVENTOR
Robert G. Clark
BY
Lewis J. Doolittle
ATTORNEY

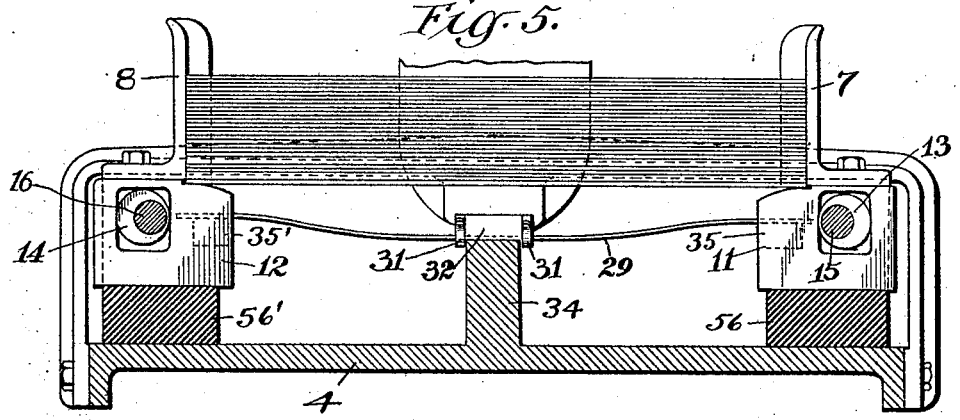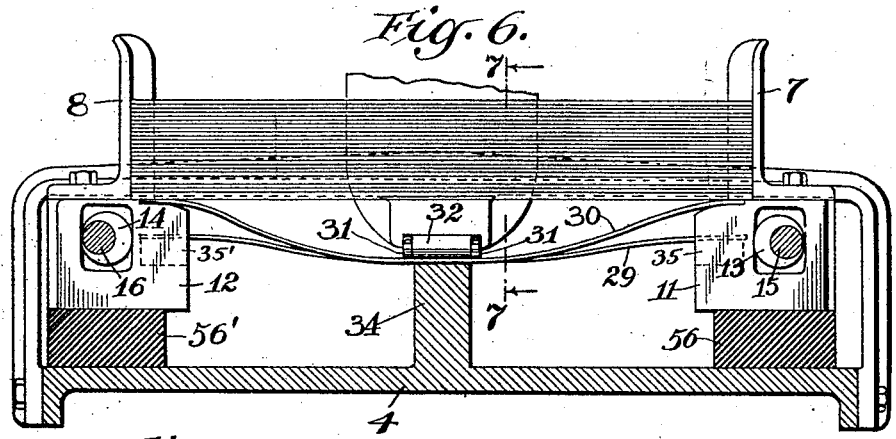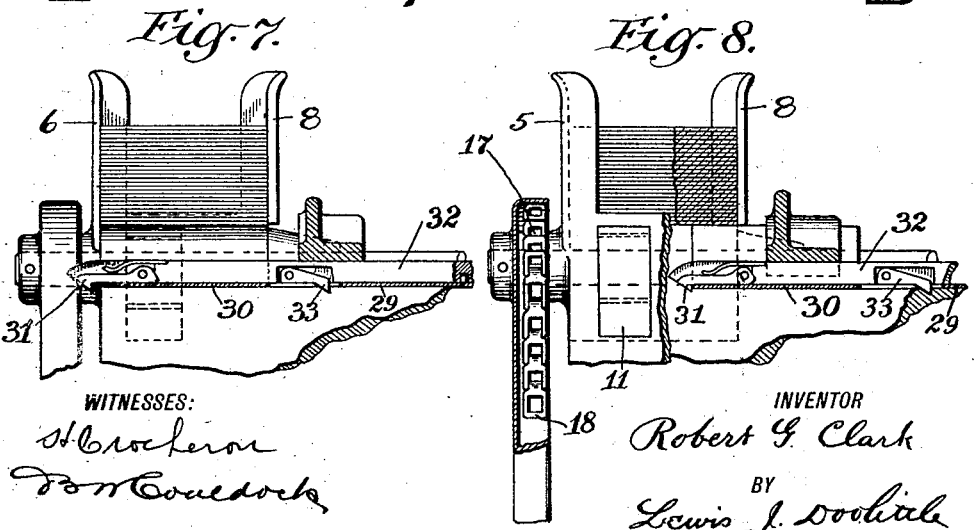

R. G. CLARK.
CAN FORMING MACHINE.
APPLICATION FILED DEC. 4, 1911.
1,086,700.
Patented Feb. 10, 1914.
7 SHEETS—SHEET 6.
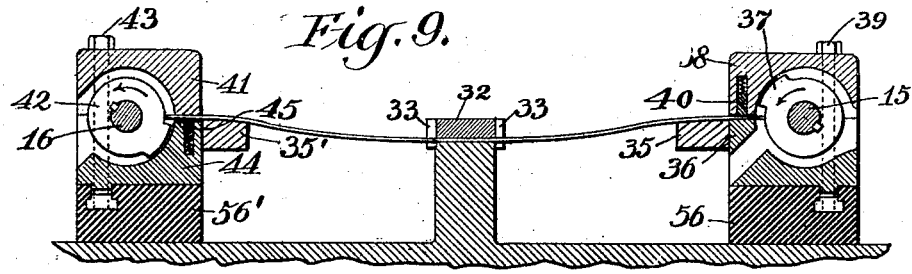
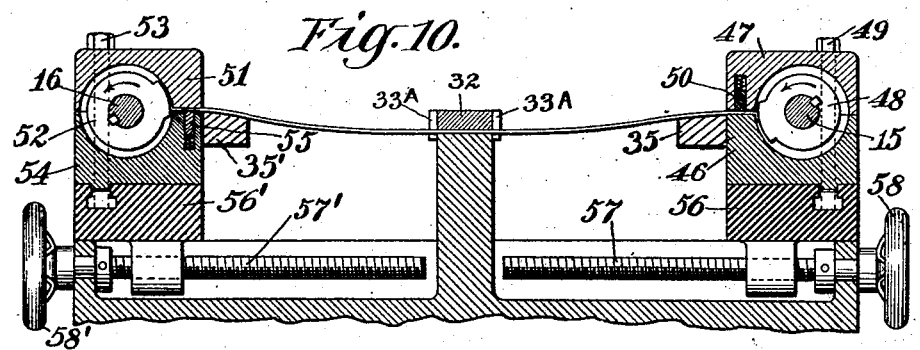
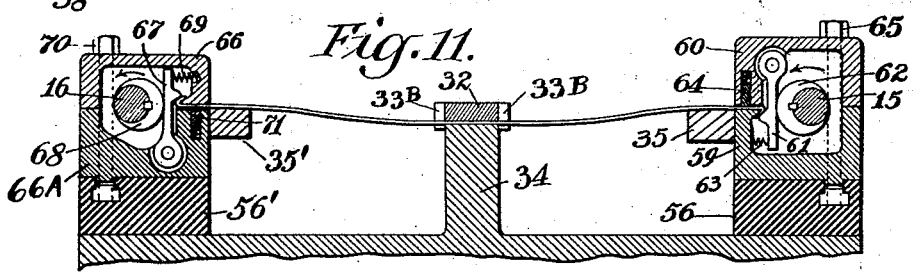
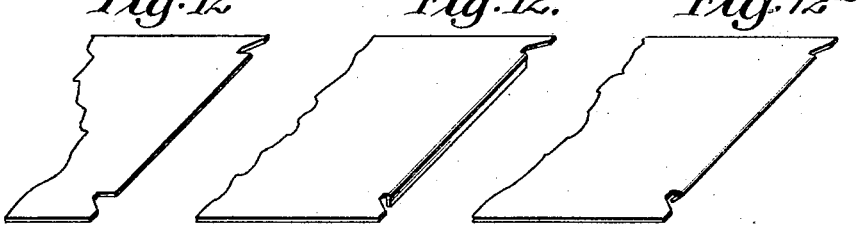
WITNESSES:
INVENTOR
Robert G. Clark
BY
Lewis J. Doolittle
ATTORNEY

R. G. CLARK.
CAN FORMING MACHINE.
APPLICATION FILED DEC. 4, 1911

1,086,700.

Patented Feb. 10, 1914.

7 SHEETS—SHEET 7.

WITNESSES:

INVENTOR
Robert G. Clark
BY
Lewis J. Doolittle
ATTORNEY

UNITED STATES PATENT OFFICE.

ROBERT G. CLARK, OF NEW YORK, N. Y., ASSIGNOR TO EMAUS FOUNDRY & MACHINE COMPANY.

CAN-FORMING MACHINE.

1,086,700.  Specification of Letters Patent.  Patented Feb. 10, 1914.

Application filed December 4, 1911. Serial No. 663,879.

*To all whom it may concern:*

Be it known that I, ROBERT G. CLARK, a citizen of the United States, and resident of the city of New York, borough of Brooklyn, county of Kings, and State of New York, have invented certain new and useful Improvements in Can-Forming Machines, of which the following is a specification.

This invention relates to a can forming machine used in the manufacture of sheet metal can bodies.

The object of the invention is to provide a simple and improved construction for a machine of this nature in which the speed or output and efficiency of the machine are materially increased and on account of an improved construction and arrangement of parts the cost of the machine is decreased.

Among the novel features of the invention is the feeding mechanism which, by reason of its peculiar construction, permits an extremely rapid feeding of the sheet metal blanks and as the output of the machine is necessarily limited by the speed with which the blanks may be fed, this feature contributes materially to increasing the output.

A continuous performance of the several consecutive operations is provided for, so that as one sheet metal blank is advanced from one operation to another, another blank is immediately fed forward taking its place, consequently no time is lost while the several operations are being performed upon any one blank.

Other features of the construction are found in the notching mechanism, in which rotary cutters are used, and also in the edging and forming mechanism by which the hook is formed in two operations, first by a rotary bending tool and completed by an oscillating tool.

The above mechanism is provided with adjustable features which enable blanks of different sizes to be used in the same machine.

Various other novel features of the invention will appear in connection with the description of the machine embodying the invention which is shown in the accompanying drawings, the operation of which will be described more fully hereinafter and the novel features specifically defined in the claims.

In the drawings like parts in the several views have been given the same reference numerals.

Figure 2:
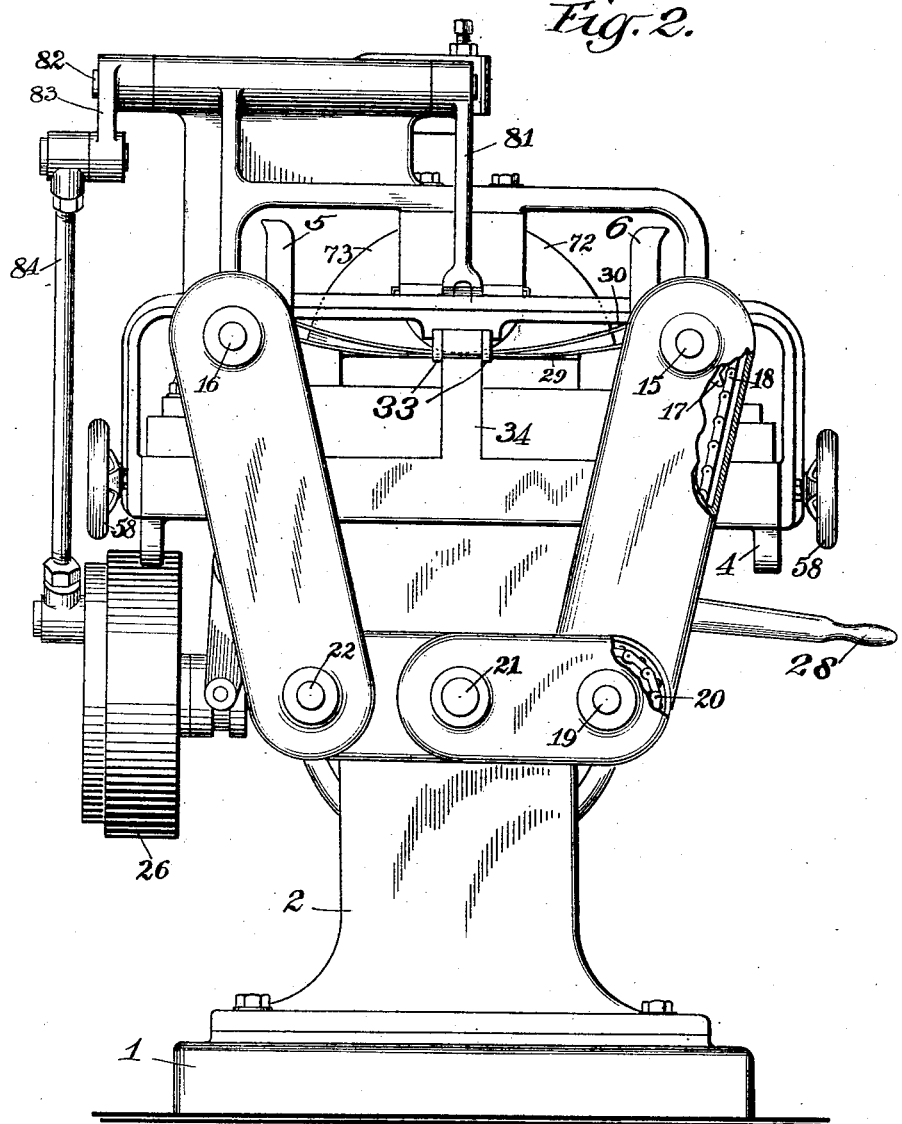
Figure 3:
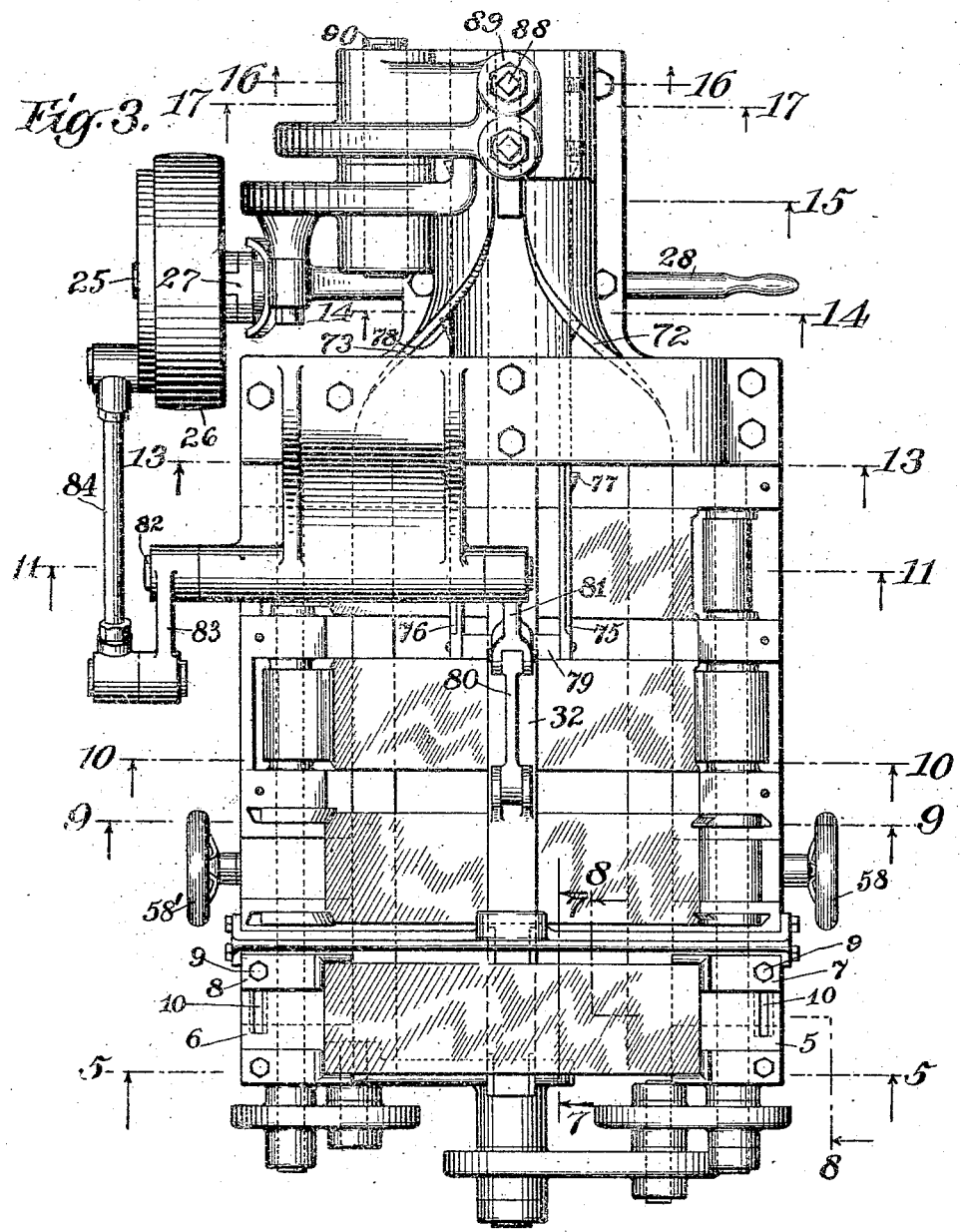
Figure 4:
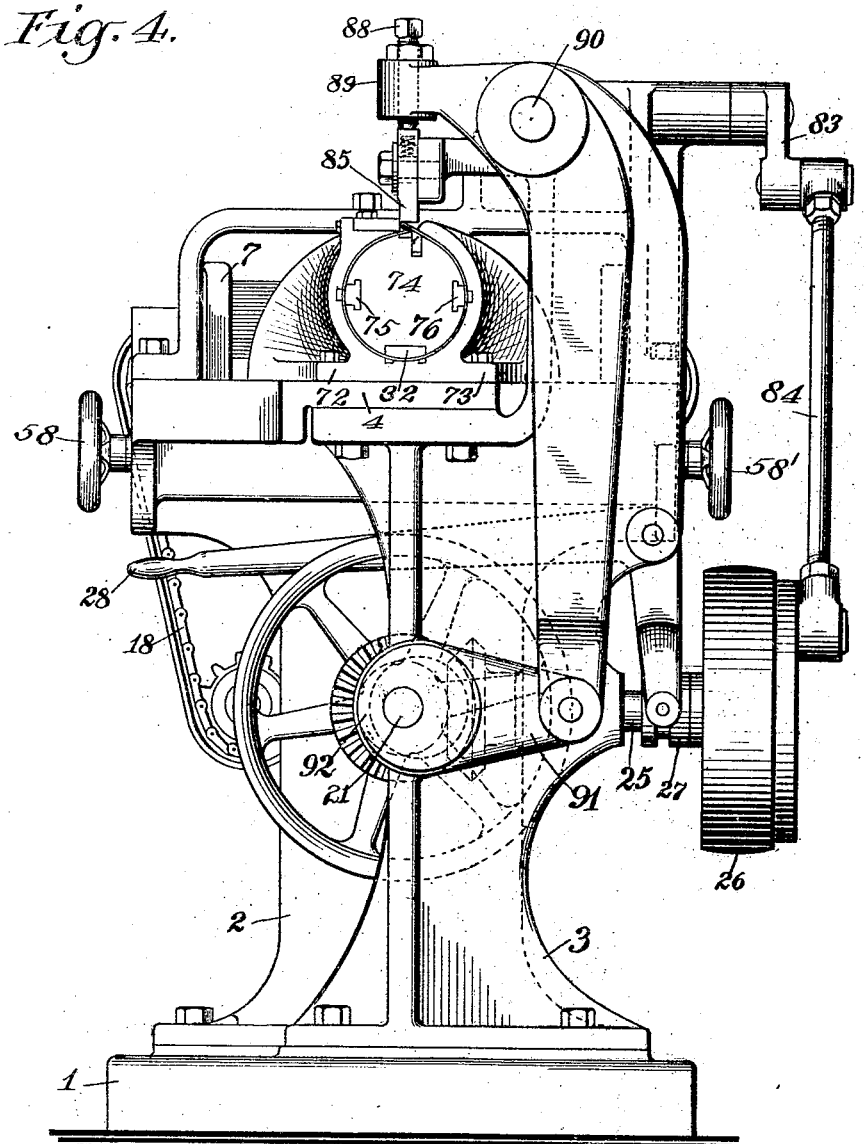
Figure 13:
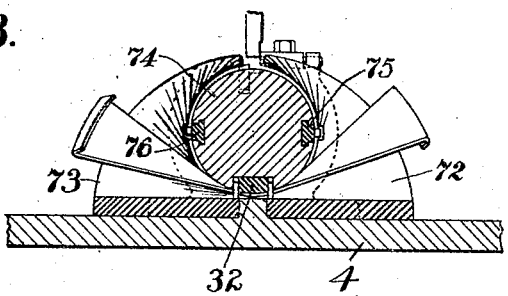
Figure 14:
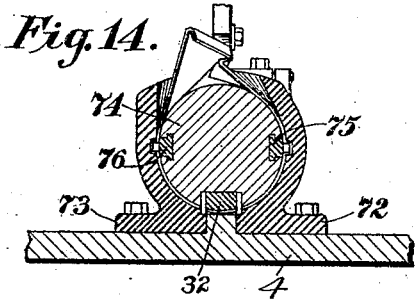
Figure 15:
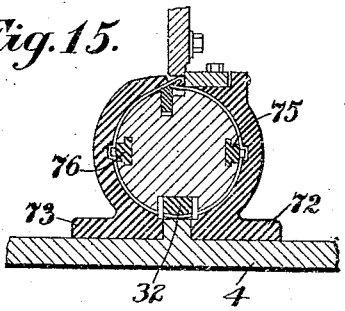
Figure 16:
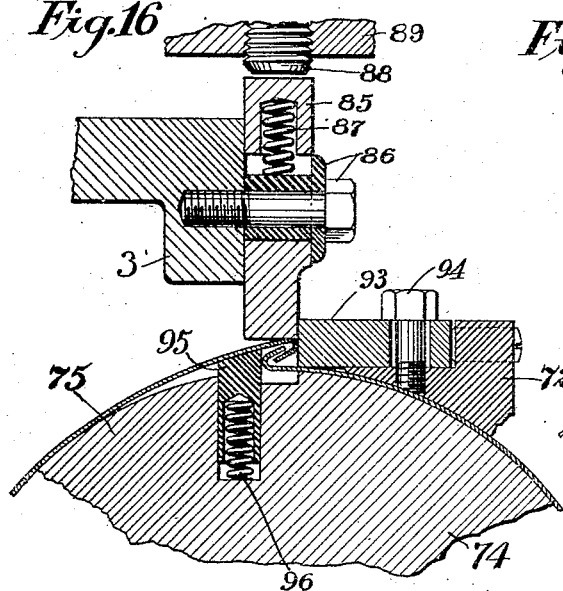
Figure 17:
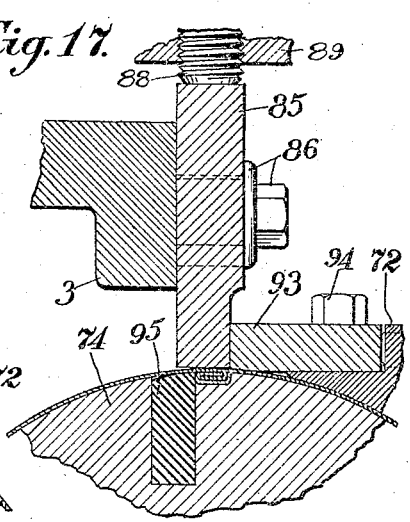

Figure 1 is a side elevation of a can forming machine. Fig. 2 is an end view taken from the left of Fig. 1. Fig. 3 is a plan view with certain of the parts removed. Fig. 4 is an end view taken from the right of Fig. 1. Fig. 5 is an enlarged sectional elevation, taken on the line 5—5 of Fig. 3. Fig. 6 is a view similar to Fig. 5, showing one step in the operation. Fig. 7 is an enlarged fragmentary elevation, taken on the line 7—7 of Fig. 3 and Fig. 6. Fig. 8 is an enlarged fragmentary elevation, partially in section, on the line 8—8 of Fig. 3. Fig. 9 is an enlarged fragmentary elevation, taken on the line 9—9 of Fig. 3. Fig. 10 is an enlarged fragmentary elevation, taken on the line 10—10 of Fig. 3. Fig. 11 is an enlarged fragmentary elevation, taken on the line 11—11 of Fig. 3. Figs. 12, 12^A and 12^B are perspective views of one end of the blank, showing the consecutive operations thereon of notching, edging and forming the hook. Fig. 13 is a fragmentary elevation on the line 13—13 of Fig. 3. Fig. 14 is a fragmentary elevation on the line 14—14 of Fig. 3. Fig. 15 is a fragmentary elevation on the line 15—15 of Fig. 3. Fig. 16 is a fragmentary elevation on the line 16—16 of Fig. 3. Fig. 17 is a fragmentary elevation on the line 17—17 of Fig. 3.

A suitable base or bed is shown at 1, provided at the front and rear with uprights or supports 2 and 3, respectively, upon which the table 4 is mounted. At the forward end of the table 4 is a hopper base 5, mounted at the right and a similar base 6 at the left upon which the hopper frames 7 and 8 are mounted and adjustably secured by means of the bolts 9 in the slots 10. The forward frames are formed in one piece with the right and left bases 5 and 6. By reason of the adjustment provided for the frames 7 and 8, different widths of blanks may be received and held at their four corners by these frames.

Referring to Figs. 5 to 8, the right and left buckling jaws are shown at 11 and 12, respectively, each of which is provided on its upper side with a shoulder slightly smaller than the thickness of the blank and with a downwardly curved surface extending therefrom upon which the blanks rest. These buckling jaws 11 and 12 are oscillated horizontally upon the side supports 56 and 56′ by means of the eccentrics 13 and 14, respectively, these eccentrics being mounted upon and driven by the right and left shafts 15 and 16, respectively. A sprocket 17 on the shaft 15 is driven by the sprocket chain 18 from the intermediate shaft 19, which in turn is driven by the sprocket chain 20 from the main driving shaft 21. In a like manner the shaft 16 is driven through the intermediate shaft 22 from the main driving shaft 21. The shafts 15 and 16 are arranged to be moved inwardly and outwardly with the mechanism operated thereby to bring the same in position to operate upon blanks of different length, as will be explained more fully hereinafter, and the arrangement of the intermediate shafts and sprocket chains just described and shown in Fig. 2, provides for this movement while preserving the distances between centers of the driving sprockets to insure the proper operation of the sprocket chains.

Referring to Fig. 1, the main driving shaft 21 is driven through the beveled gears 23 and 24 from the pulley shaft 25, which in turn is driven by the driving pulley 26. A clutch 27, operated by the lever 28, is positioned between the shaft 25 and the driving pulley 26, as shown in Fig. 4.

Referring to Figs. 5 to 8, a number of sheet metal blanks are shown in position in the hopper resting upon the right and left jaws 11 and 12, so that the lower blank is in position to be engaged by the shoulders on the buckling jaws. The eccentrics 13 and 14 being rotated by the shafts 15 and 16, which are driven from the main shaft 21, as already described, cause the buckling jaws 11 and 12 to be oscillated inwardly toward each other from the position shown in Fig. 5 to the position shown in Fig. 6. This movement causes the lower blank 29 to be bent or buckled downwardly at its central portion until it rests upon the central support 34, in which position it is then engaged by the first set of feed bar dogs 31 which are carried by the feed bar 32 over the upper surface thereof, the feed bar being in turn oscillated in the manner which will be described more fully hereinafter. The dogs 31 engaging the blank at its forward edge draw the same toward the rear of the machine, the outer ends of the blank sliding off from the buckling jaws 11 and 12 upon the side supports 35 and 35', upon which they rest and are advanced for the succeeding operations. The first portion of this operation is shown in Fig. 7 while the progressive movement thereof is shown in Figs. 8, 5 and 6 successively. In Fig. 6 the blank 29 is shown as having been advanced to the second position while the second blank 30 has been buckled downwardly and is about to be engaged by the jaws 31 and advanced in a like manner.

The next step in the operation is shown in Fig. 9 where the blank has been engaged by the dogs 33 and advanced into position to be operated upon by the notching device. The notching mechanism comprises a die 36 at the right, a rotary notching cutter 37 mounted upon and driven by the shaft 15 and a cap 38 secured upon the die 36 and fastened to the side support 56 by the bolts 39. A spring pressed pressure foot 40 is positioned in the cap 38 to hold this end of the blank in position while the same is operated upon by the rotary cutter 37, which operation consists in notching the end of the blank in the form shown in Fig. 12. Similar notching mechanism is provided at the left, comprising a die 41, which also forms a cap, a rotary cutter 42 mounted upon and driven by the shaft 16 and bolts 43 securing the die 41 and the lower half 44 to the side support 56'. A pressure foot 45 is positioned in the lower half 44 and holds the left hand end of the blank in position against the die 41 as the same is operated upon by the cutter 42. The direction of rotation of the cutters 37 and 42 is the same but they operate upon the blank in opposite directions, that is, the one at the right moves downwardly while the one at the left moves upwardly with respect to the blank.

The next step in the operation is shown in in Fig. 10, the blank being advanced to this position by another set of dogs 33^A, in which position the edging and hook forming operations upon the blank are performed. The edging device comprises a bending die 46 at the right, a bending die cap 47 and a rotary bending tool 48 secured to and driven by the shaft 15. The cap 47 and die 46 are secured to the side support 56 by means of the bolts 49. A spring pressed pressure foot 50 is positioned in the cap 47 and holds the end of the blank against the die 46 while the same is operated upon by the bending tool 48. The bending tool 48 bends this end of the blank downwardly at substantially right angles in the form shown in Fig. 12^A. A similar construction is provided at the left, comprising a bending die and cap 51, a bending tool 52 and bolts 53 securing the bending die and the lower half 54 to the side support 56'. A spring pressed pressure foot 55 is positioned in the lower half 54 and holds this end of the blank against the bending die 51. The operation upon this end of the blank is performed simultaneously with that on the opposite end and in a similar manner, with the exception that the bending tool 52 bends this end of the blank up instead of down, as shown in Fig. 10.

The next step in the operation is shown in Fig. 11, the blank being advanced to this position by the dogs 33^B, in which position the hook is formed. The hook forming device comprises a die 59 at the right, a cap 60 and the hook forming tool 61, which is pivotally attached to the cap 60 and operated by the eccentric 62 mounted upon and rotated by the shaft 15. A spring 63 holds the forming tool 61 in engagement with the eccentric 62. Bolts 65 secure the die 59 and the cap 60 to the side support 56.

The hook forming mechanism at the left is similarly constructed and comprises a die and cap 66, a hook forming tool 67 operated by the eccentric 68 secured to and driven by the shaft 16. A spring 69 in the cap 66 holds the hook forming tool 67 in engagement with the eccentric 68. Bolts 70 secure the die and cap 66 and the lower half 66$^A$ with the side support 56'. A spring pressed pressure foot 71 is positioned in the lower half 66$^A$ and holds this end of the blank against the die 66. The hook forming tool 67 is pivotally mounted in the lower half 66$^A$ and forms the hook on this end of the plate on the upper side thereof in a similar manner to that on the opposite end of the blank formed by the hook forming mechanism on the right just described.

The side supports 56 and 56' carry the hopper, buckling jaws, notching and edging mechanism and the hook forming mechanism, together with the shafts 15 and 16 which operate the same. These side supports are adjustable to accommodate blanks of different sizes by means of the adjusting screws 57 and 57' operated by the hand wheels 58 and 58', shown in Figs. 3 and 10. Mounting these several devices upon a single support on each side provides for a simple adjustment of the same and a more perfect alinement is secured. By operating all of the mechanism from the two parallel shafts, the construction is greatly simplified.

The blank is next advanced for the forming operation, which is accomplished by providing curved inclined members, 72 at the right and 73 at the left, and a horn 74. This portion of the operation is clearly shown in Figs. 13, 14 and 15. The blank is caused to pass over the inclines 72 and 73 by the movement of the feed bar 32 and the dogs carried thereby in a like manner as it has been advanced through the preceding operations. The blank is first bent upwardly at its ends, as shown in Fig. 13, and finally wrapped around the horn 74, as shown in Figs. 14 and 15. When the blank has reached the position shown in Fig. 14, it is advanced by the right and left feed bars 75 and 76 carried by the horn 74, said right hand feed bar 75 being provided with dogs 77 and the left hand feed bar 76 provided with dogs 78, in the manner which will be well understood by reference to the drawings.

In Figs. 1 and 3, the operating mechanism for the feed bars is clearly shown and comprises the cross head 79 attached to the feed bar 32 and from which the feed bars 75 and 76 are operated. A link 80 connects the lever 81 with the feed bar 32. The lever 81 is mounted upon a shaft 82, at the outer end of which is attached a lever 83 which is oscillated by means of the connecting rod 84 from a crank disk attached to the driving shaft 25. The blank now having been advanced over the inclines 72 and 73 and wrapped around the horn 74, the hooks at the end of the same have been brought into engagement in the position shown in Fig. 15, also shown in enlarged scale and more in detail in Fig. 16. In this position the joint or side seam is closed by means of the bumping device shown in Figs. 16 and 17. The bumping device comprises a bumping steel 85, which is mounted upon the rear upright 3 by means of bolts and bushings 86, so as to permit a reciprocating motion thereof. The spring 87 normally holds the bumper steel 85 in its upper position in which position it is engaged by the bumper screw 88, adjustably carried by the bumper arm 89 (shown in Fig. 4) which is pivotally mounted on the upright frame upon a fixed shaft 90 and is operated by the eccentric arm 91 and an eccentric 92 on the shaft 21. The adjustable guide 93 is mounted upon the right incline 72 by means of the bolt 94, as shown in Fig. 16. A guide 95 is resiliently held against the blank by means of the spring 96 and positioned on the upper side of the horn 74, as shown in Fig. 16, for guiding this end of the blank while the hooks are being engaged and also for holding the same in position to be operated upon by the bumper steel 85, when the joint is closed, as shown in Fig. 17. A further movement of the feeding bars delivers the can body completely formed from the horn.

The horn 74 and the parts carried thereby, the body forming incline members 72 and 73 and the bumping steel 85 are removable so that the same may be replaced by other members to form cans of different sizes.

The notching dies, caps and cutters also the edging dies, caps and bending tools and the hook forming dies, caps and tools are removable so that the same may be replaced by other members to accommodate blanks of different widths. The adjustment of the side supports and driving shafts for these devices to accommodate blanks of different lengths has already been described.

It will thus be seen that the machine embodying this invention provides for a continuous operation of the consecutive operations and that on account of the positive and simple construction of the feeding mechanism the output and efficiency of the machine is increased.

As many changes could be made in the above construction and many apparently widely different embodiments of my invention designed without departing from the scope of the appended claims, I intend that all matter contained in the above description or shown in the accompanying drawings shall be interpreted as illustrative merely of an operative embodiment of my invention and not in a limiting sense.

What I claim is:

1. The combination in a can forming machine, of a hopper, a pair of buckling jaws upon which the blanks in said hopper are supported at their opposite ends, said jaws being formed to successively engage the edge of the blanks and move inwardly to cause the same to be buckled into position to be engaged by the feeding mechanism, means for operating said buckling jaws, and feeding mechanism for feeding said blanks successively into the machine.

2. The combination in a can forming machine, of a hopper, buckling jaws each provided with a shoulder adapted to successively engage the blanks in said hopper and cause the same to be buckled into position to be engaged by the feeding mechanism, means for operating said buckling jaws, and feeding mechanism for feeding said blanks successively into the machine.

3. The combination in a can forming machine, of a hopper, buckling jaws each provided with a shoulder and a downwardly curved surface upon which the blanks rest adapted to successively engage the blanks in said hopper and cause the same to be buckled into position to be engaged by the feeding mechanism, means for operating said buckling jaws, and feeding mechanism for feeding said blanks successively into the machine.

4. The combination in a can forming machine, of a hopper, buckling jaws positioned at opposite ends of said hopper and adapted to successively engage the blanks in said hopper and cause the same to be buckled into position to be engaged by the feeding mechanism, eccentrics mounted upon shafts at opposite sides of said machine positioned to engage said buckling jaws, and feeding mechanism for feeding said blanks successively into the machine.

5. The combination in a can forming machine, of an adjustable hopper adapted to receive blanks of different sizes, adjustable buckling jaws adapted to successively engage the blanks in said hopper and cause the same to be buckled into position to be engaged by the feeding mechanism, means for operating said buckling jaws, and feeding mechanism for feeding said blanks successively into the machine.

6. The combination in a can forming machine, of a hopper, buckling jaws adapted to successively engage the blanks in said hopper and cause the same to be buckled into position to be engaged by the feeding mechanism, eccentrics and operating shafts for operating said jaws, said operating shafts being driven through intermediate shafts from a main shaft, and feeding mechanism for feeding said blanks successively into the machine.

7. The combination in a can forming machine, of notching mechanism comprising a rotary notching cutter, a die and cap in which said cutter rotates formed for holding the blank in position to be operated upon by said cutter, and means for feeding the blanks successively to said notching mechanism.

8. The combination in a can forming machine, of notching mechanism comprising a rotary notching cutter, means including a die and cap and a spring pressed pressure foot mounted therein for holding the blank in position to be operated upon by said cutter, and means for feeding the blanks successively to said notching mechanism.

9. The combination in a can forming machine, of hook forming mechanism comprising a rotary bending tool adapted to bend the end of the blank at right angles, means for holding the blank stationary while being operated upon by said tool, a reciprocating hook forming tool adapted to engage the aforesaid bent portion of the blank and further bend the same to form the hook, means for holding the blank stationary while being operated upon by said tool, means for operating said tools, and means for feeding the blanks successively thereto.

10. The combination in a can forming machine, of hook forming mechanism comprising a pair of rotary bending tools positioned to operate upon opposite ends of a blank, means for holding the blank in position to be operated upon by said tools, a pair of reciprocating hook forming tools positioned to operate upon opposite ends of the blank, means for holding the blank in position to be operated upon by said tools, means for operating said tools, and means for feeding the blanks successively thereto.

11. The combination in a can forming machine, of hook forming mechanism comprising a rotary bending tool, a die and cap for holding the blank in position to be operated upon by said tool, a reciprocating hook forming tool, a die and cap for holding the blank in position to be operated upon by said tool, means for operating said tools, and means for feeding the blanks successively thereto.

12. The combination in a can forming machine, of hook forming mechanism comprising a rotary bending tool, a die and cap in which said bending tool is rotated for holding the blank in position to be operated upon by said tool, a reciprocating hook forming tool, a die and cap in which said tool reciprocates for holding the blank in position to be operated upon by said tool, means for operating said tools, and means for feeding the blanks successively thereto.

13. The combination in a can forming machine, of hook forming mechanism comprising a pair of rotary bending tools adjustably mounted with relation to the blank and adapted to operate upon opposite ends thereof, means for holding the blank in position to be operated upon by said tools, a pair of reciprocating hook forming tools adjustably mounted with relation to the blank and adapted to operate upon opposite ends thereof, means for holding the blank in position to be operated upon by said tools, means for operating said tools, and means for feeding the blanks successively thereto.

14. The combination in a can forming machine, of hook forming mechanism comprising a pair of rotary bending tools rotating in opposite directions with respect to the blank and adapted to operate upon opposite ends thereof, means for holding the blank in position to be operated upon by said tools, a pair of reciprocating hook forming tools positioned to operate upon opposite ends of the blank, means for holding the blank in position to be operated upon by said tools, means for operating said tools, and means for feeding the blanks successively thereto.

15. In a can forming machine, in combination, a hopper, buckling jaws adapted to buckle the blanks in said hopper successively into position to be advanced by the feeding means, notching mechanism, edging mechanism, hook forming mechanism, common operating means for operating said mechanisms and buckling jaws, and feeding means adapted to feed the blanks from said hopper into position to be operated upon successively by said mechanisms.

16. In a can forming machine, in combination, a hopper, buckling jaws adapted to buckle the blanks in said hopper successively into position to be advanced by the feeding means, notching mechanism, edging mechanism, hook forming mechanism, common operating means for operating said mechanisms and buckling jaws, said hopper, buckling jaws, mechanism and operating means being adjustably mounted to accommodate blanks of different sizes, means for adjusting the same, and feeding means adapted to feed the blanks from said hopper into position to be operated upon successively by said mechanisms.

17. In a can forming machine, in combination, a hopper, buckling jaws adapted to buckle the blanks in said hopper successively into position to be advanced by the feeding means, notching mechanism, edging mechanism, hook forming mechanism, common operating means for operating said mechanisms and buckling jaws said hopper, buckling jaws, mechanisms and operating means being mounted upon two adjustable supports at either side of the machine, means for adjusting said supports, and feeding means adapted to feed the blanks from said hopper into position to be operated upon successively by said mechanisms.

18. In a can forming machine, in combination, a hopper, buckling jaws adapted to buckle the blanks in said hopper successively into position to be advanced by the feeding means, notching mechanism, edging mechanism, hook forming mechanism, two parallel operating shafts for operating said mechanisms and buckling jaws, and feeding means adapted to feed the blanks from said hopper into position to be operated upon successively by said mechanisms.

Signed at New York city, in the county of and State of New York, this 20th day of Nov., 1911.

ROBERT G. CLARK.

Witnesses:
B. W. COULDOCK,
BENJ. W. LEWIS.